United States Patent [19]

Alperovich et al.

[11] Patent Number: 5,878,338
[45] Date of Patent: Mar. 2, 1999

[54] SYSTEM AND METHOD OF RESTRICTING INCOMING CALLS BY COMPARING THE FORWARDED-FROM DIRECTORY NUMBER TO A DIRECTORY NUMBER STORED WITHIN THE NETWORK

[75] Inventors: Vladimir Alperovich, Dallas; Eric Valentine, Plano, both of Tex.

[73] Assignee: Ericsson Inc., Research Trinagle Park, N.C.

[21] Appl. No.: 690,121

[22] Filed: Jul. 31, 1996

[51] Int. Cl.$^6$ .................................................. H41M 11/00
[52] U.S. Cl. ............................................ 455/417; 379/211
[58] Field of Search ..................................... 379/210, 211, 379/212; 455/461, 433, 445, 414, 432, 417

[56] References Cited

U.S. PATENT DOCUMENTS

| | | | |
|---|---|---|---|
| 4,278,844 | 7/1981 | Jones | 379/212 |
| 4,723,273 | 2/1988 | Diesel et al. | 379/212 |
| 5,307,400 | 4/1994 | Sawyer et al. | 455/445 |
| 5,329,578 | 7/1994 | Brennan et al. | 455/433 |
| 5,353,331 | 10/1994 | Emery et al. | 455/433 |
| 5,463,683 | 10/1995 | Collins et a. | 379/211 |
| 5,467,388 | 11/1995 | Redd, Jr. et al. | 379/211 |
| 5,473,671 | 12/1995 | Partridge | 455/445 |
| 5,553,128 | 9/1996 | Grimes | 379/211 |
| 5,592,541 | 1/1997 | Fleishcer et al. | 455/445 |
| 5,600,704 | 2/1997 | Ahlberg et al. | 455/445 |
| 5,610,972 | 3/1997 | Emery et al. | 455/414 |
| 5,615,253 | 3/1997 | Kocan et al. | 379/211 |
| 5,642,396 | 6/1997 | Cowgill | 379/221 |
| 5,711,002 | 1/1998 | Foti | 379/211 |
| 5,729,599 | 4/1998 | Plomondon et al. | 379/211 |

OTHER PUBLICATIONS

*European Digital Cellular Telecommunications System (Phase 2): Unstructured Supplementary Service Data (USSD)—Stage 2 (GSM 03.90)*: European Telecommunication Standard; Final Draft pr ETS 300 549; Reference No. DE/SMG–03039OP; Nov. 1994; (pp. 1–37).

*European Digital Cellular Telecommunications System (Phase 2): Unstructured Supplementary Service Data (USSD)—Satge 3 (GSM 04.90)*; European Telecommunication Standard; Final Draft pr ETS 300 572; Reference No. DE/SMG–03049OP; Nov. 1994; (pp. 1–16).

*Primary Examiner*—David R. Hudspeth
*Assistant Examiner*—M. David Sofocleous
*Attorney, Agent, or Firm*—Jenkens & Gilchrist

[57] ABSTRACT

The present invention provides a method and apparatus for selectively restricting only forwarded calls. Upon realizing that an incoming call was incorrectly forwarded, the terminal receiving the incoming call transmits to a telecommunications exchange an indication requesting activation of a subscriber feature that will restrict only forwarded calls from the terminal forwarding the call. The directory number for the terminal forwarding the call is retrieved from a register. That retrieved directory number is correlated with the directory number representing the terminal incorrectly receiving the forwarded call and the correlated data is stored at a database. Upon the receipt of the next incoming call, the telecommunications exchange determines that the call is forwarded. Then, the directory number associated with the forwarding party is compared against the data previously correlated and stored in the database. If the directory number associated with the forwarding party matches the directory number stored in the database, the call is rejected.

22 Claims, 10 Drawing Sheets

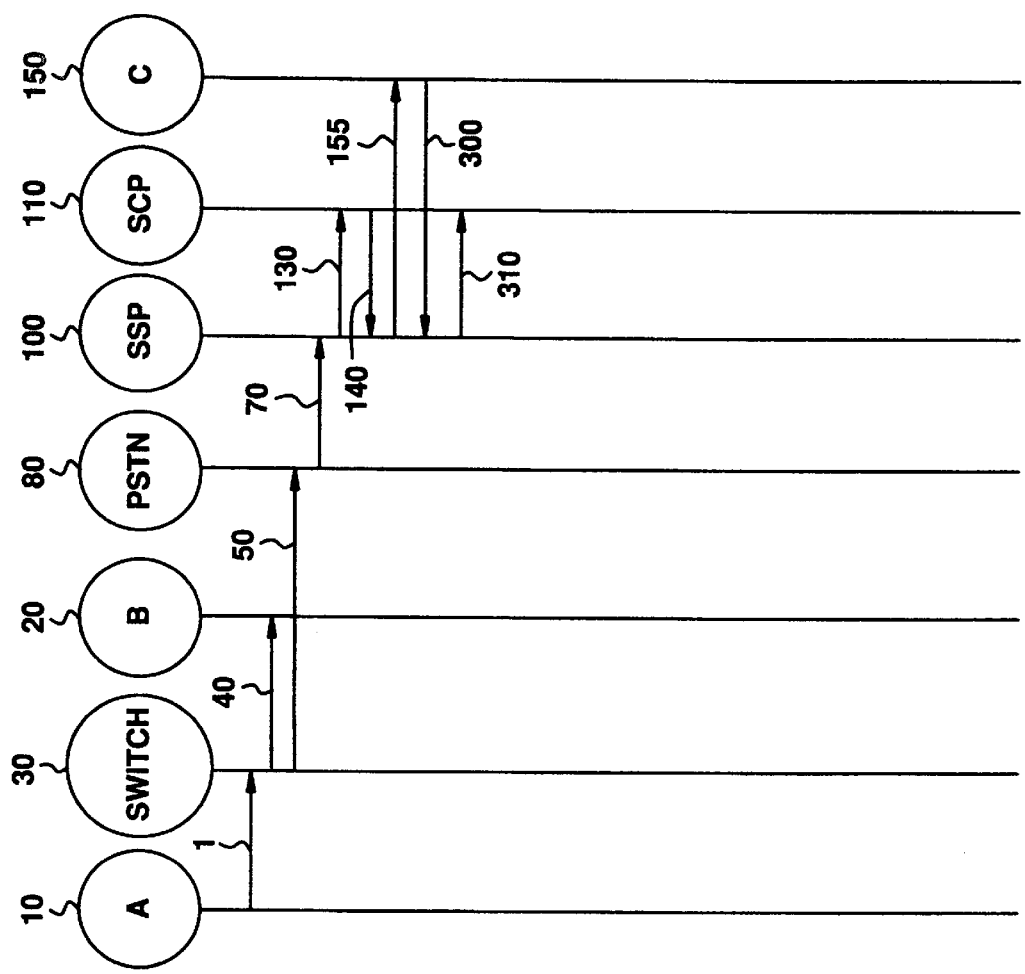

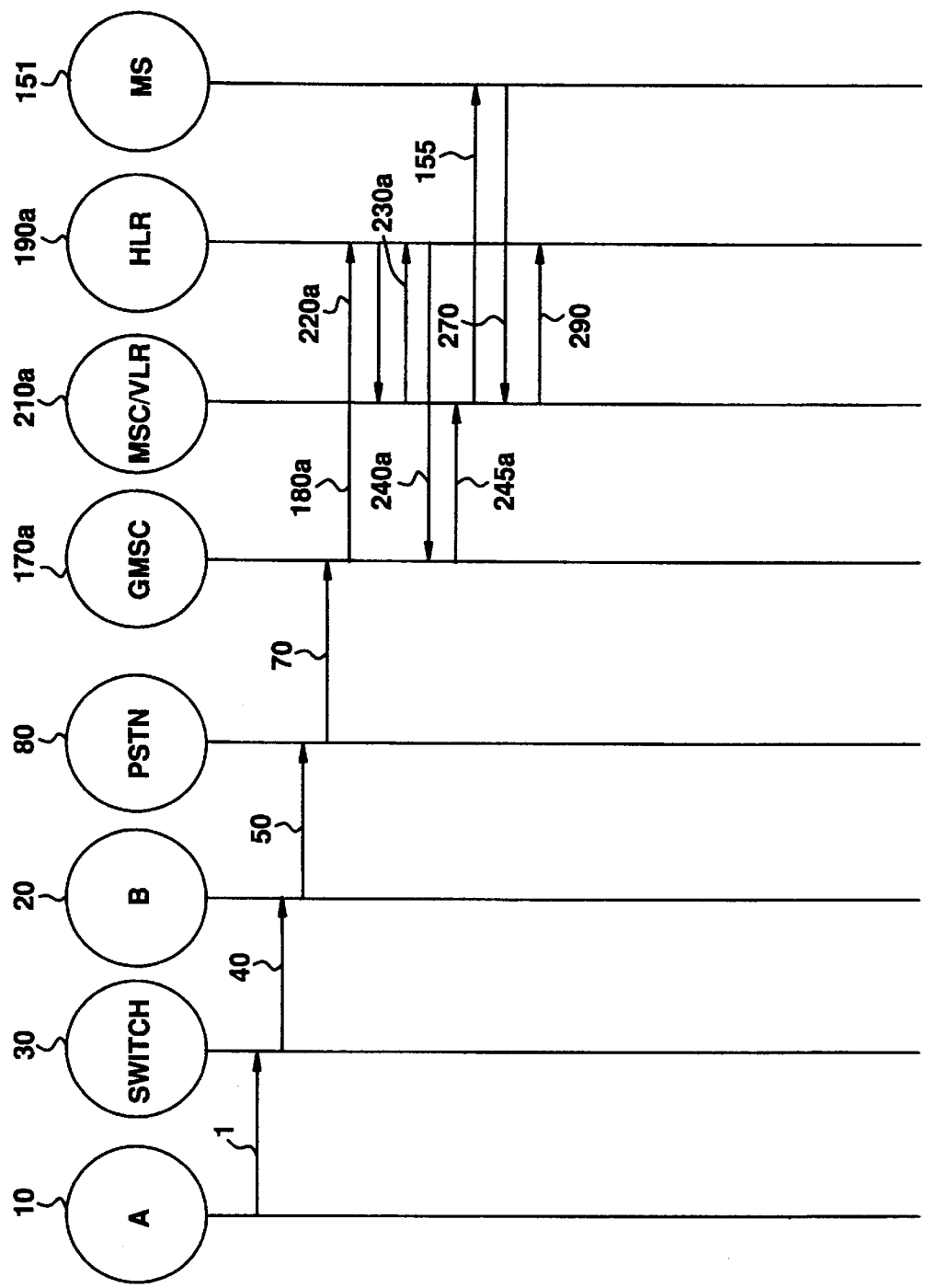

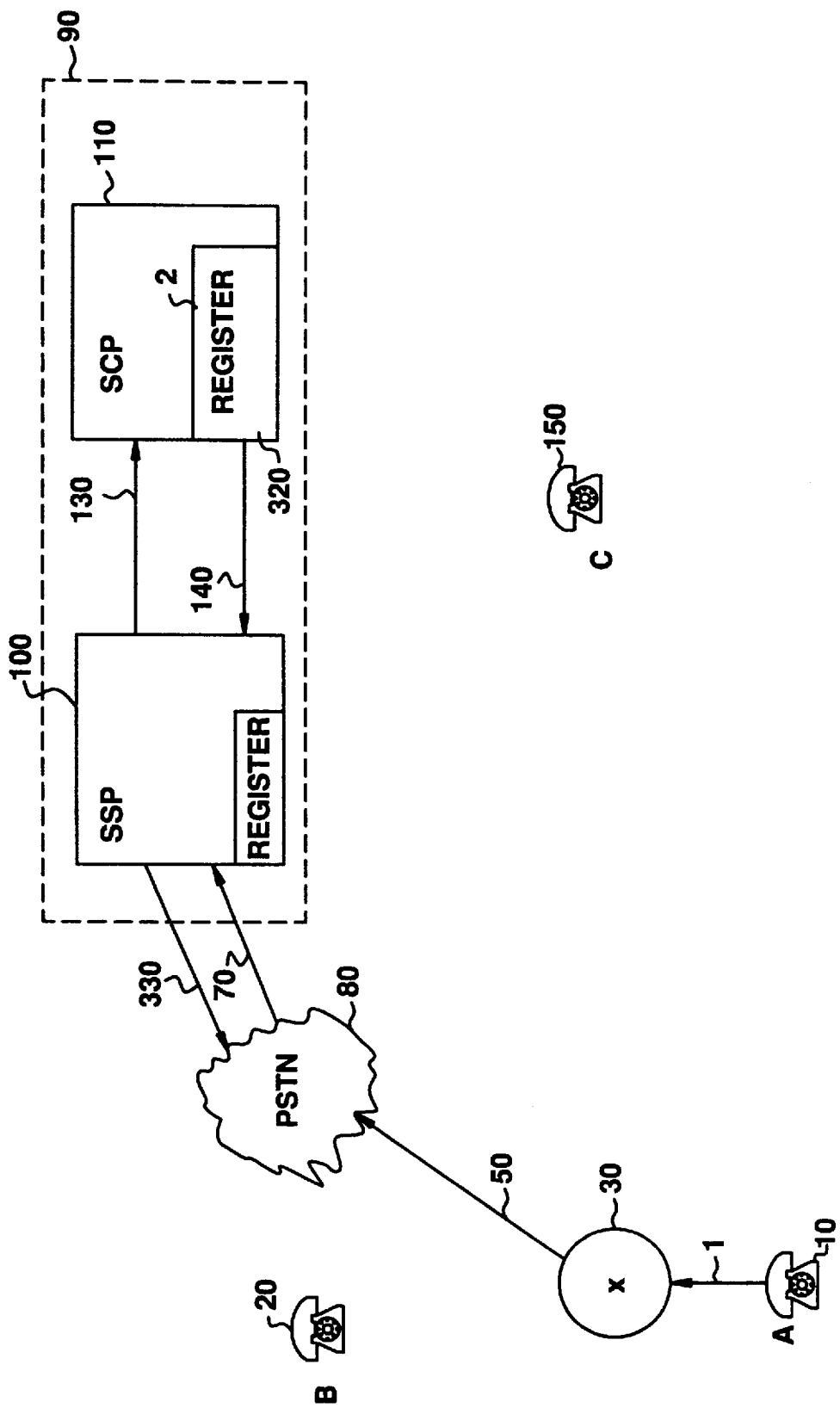

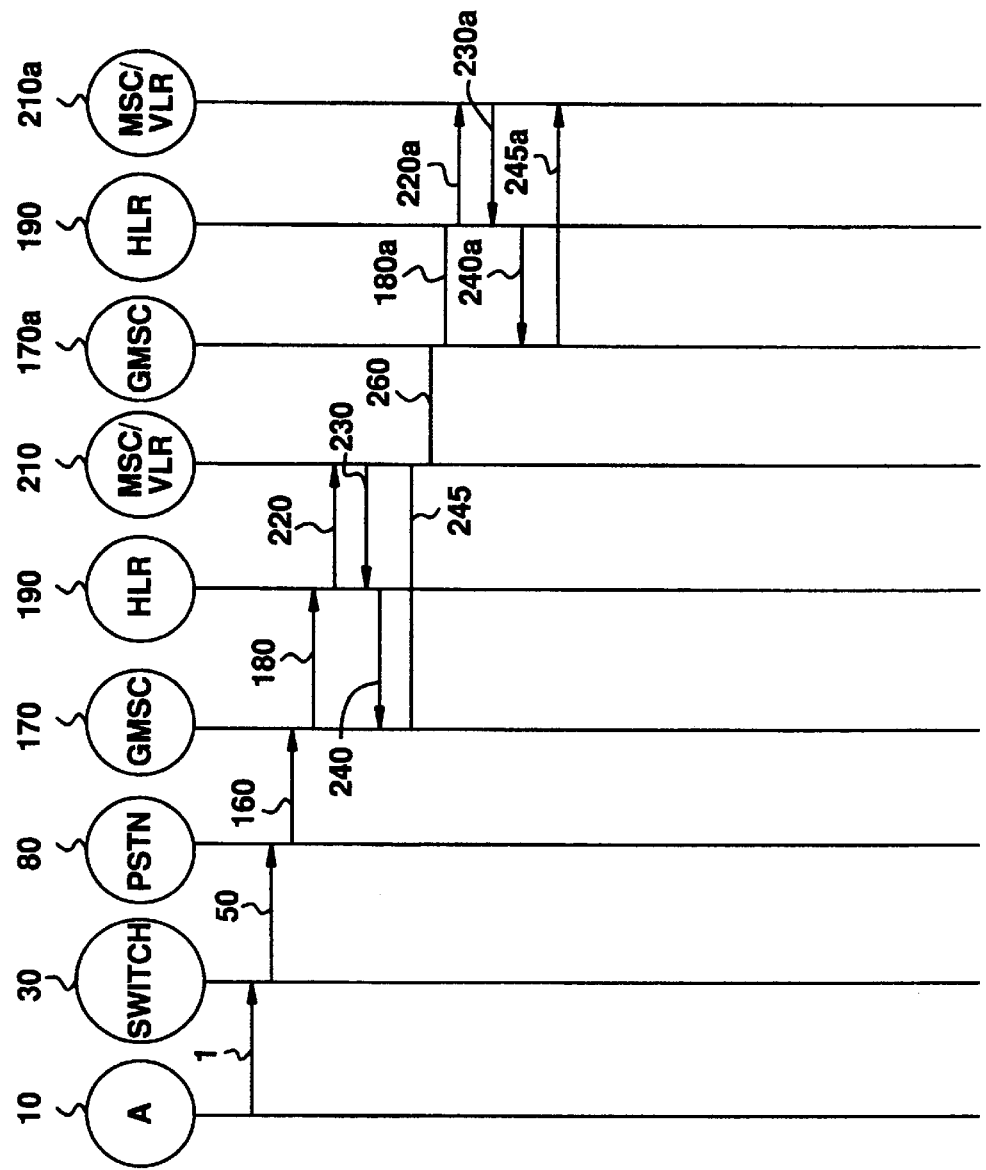

SYSTEM AND METHOD OF RESTRICTING INCOMING CALLS BY COMPARING THE FORWARDED-FROM DIRECTORY NUMBER TO A DIRECTORY NUMBER STORED WITHIN THE NETWORK

BACKGROUND OF THE INVENTION

1. Technical Field of the Invention

The present invention relates to a telecommunications system and, in particular, to the restriction of incoming forwarded calls from certain designated numbers.

2. Description of Related Art

With the wide spread availability of call forwarding subscriber features within a telecommunications system, a subscriber is able to forward incoming calls to a particular forward-to number. After activating a particular call forwarding feature by providing a forward-to directory number to a serving switching system, the serving switching system automatically reroutes incoming calls to the provided forward-to number. All or some of the subscriber's incoming calls can be forwarded, depending upon the activated call forwarding feature. For example, incoming calls to the subscriber can be forwarded only when the line is busy, as provided by the Call Forwarding on Busy (CFB) feature, or only when the line is not answered, as provided by the Call Forward Don't Answer (CFDA) feature. Even though the conventional call forwarding features enable a telecommunications subscriber to conveniently forward an incoming call to a forward-to number, there still exists certain undesirable characteristics and limitations imposed by these call forwarding features.

For example, due to human error, the subscriber may incorrectly enter the forward-to number. The result of the incorrect entry is that the wrong telecommunications subscriber is forced to answer and screen these forwarded calls. If the telecommunications terminal forwarding the calls is a high volume terminal, such as a customer service line or a distributor's line, the telecommunications subscriber incorrectly receiving the forwarded calls is greatly burdened. For example, the party receiving the incorrectly forwarded calls might be a small business. If a distributor associated with the small business forwards its calls to the small business, daily operations at that small business are greatly disrupted because the employees are forced to constantly answer and screen incoming calls forwarded by the distributor.

A number of implementations have been developed to alleviate some of the problems and limitations imposed by the above scenario. One such implementation enables the telecommunications subscriber receiving the incorrectly forwarded calls to block all incoming calls from the forwarding number. Unfortunately, this option also blocks direct calls originated by the forwarding number. This option is, accordingly, acceptable as long as the ability for the distributor to dial the small business directly is unimportant. If, however, the direct calls from the distributor are important, the small business has no option but to accept all calls from the distributor and wastefully devote resources to answer and screen the incorrectly forwarded calls. Accordingly, there is a need for an improved and more selective mechanism to bar forwarded calls from a particular forwarded-from number.

SUMMARY OF THE INVENTION

In current telecommunications systems, the process of forwarding calls generally includes the following steps. First, an outgoing call originated by a first terminal to a second terminal is forwarded by a first local exchange, serving the second terminal, to a third terminal as provided by a call forwarding feature associated with the second terminal. Next, the redirection counter contained in the call setup signal, which is routed to a second local exchange serving the third terminal, is increased by one. Then, the new call set-up signal is formed and comprises, as the called party number, the directory number representing the third terminal. Finally, the forwarded-from number representing the second terminal is extracted from the received call setup signal and stored in a first register associated with the second local exchange which serves the third terminal.

The present invention utilizes the above process and provides an improved method and apparatus for activating a feature to selectively restrict incoming calls forwarded from a particular telecommunications terminal. It is understood that activation of the feature will not restrict direct calls originated from any telecommunications terminal. After the completion of the forwarded call to the third terminal, the second local exchange receives an indication from the third terminal instructing the second local exchange to restrict subsequent incoming calls forwarded from the second terminal. Upon receipt of the indication, the stored directory number associated with the second terminal is retrieved from the first register. Data correlating the retrieved directory number to be blocked with the directory number representing the third terminal is stored at a second register associated with the second local exchange.

Furthermore, the present invention provides a method and apparatus for selectively restricting incoming calls forwarded from a particular telecommunications terminal. Again, it is understood that the present invention will not restrict direct calls originated from any telecommunications terminal. For each received call setup signal, the redirection counter of that call to the third terminal is checked to see if the call is a forwarded call (i.e., is the redirection counter greater than zero?). If the call is a forwarded call, the second register is indexed using the directory number representing the third terminal and the correlated directory number from which only forwarded calls are to be blocked is retrieved. The retrieved directory number is then compared against the forwarded-from number contained in the incoming call setup signal. If there is a match, the call is rejected.

BRIEF DESCRIPTION OF THE DRAWINGS

A more complete understanding of the method and apparatus of the present invention may be had by reference to the following Detailed Description when taken in conjunction with the accompanying drawings wherein:

FIG. 3 and 3a are, respectively, a block diagram and a sequence diagram of an Intelligent Network being instructed to restrict subsequent incoming forwarded calls;

FIG. 4 and 4a are, respectively, a block diagram and a sequence diagram of a Public Land Mobile Network being instructed to restrict subsequent incoming forwarded calls in accordance with the teachings of the present invention;

FIG. 5 and 5a are, respectively, a block diagram and a sequence diagram of an Intelligent Network rejecting a forwarded call; and FIG. 6 and 6a are, respectively, a block diagram and a sequence diagram of a Public Land Mobile Network rejecting a forwarded call.

DETAILED DESCRIPTION OF THE DRAWINGS

Figure 1:
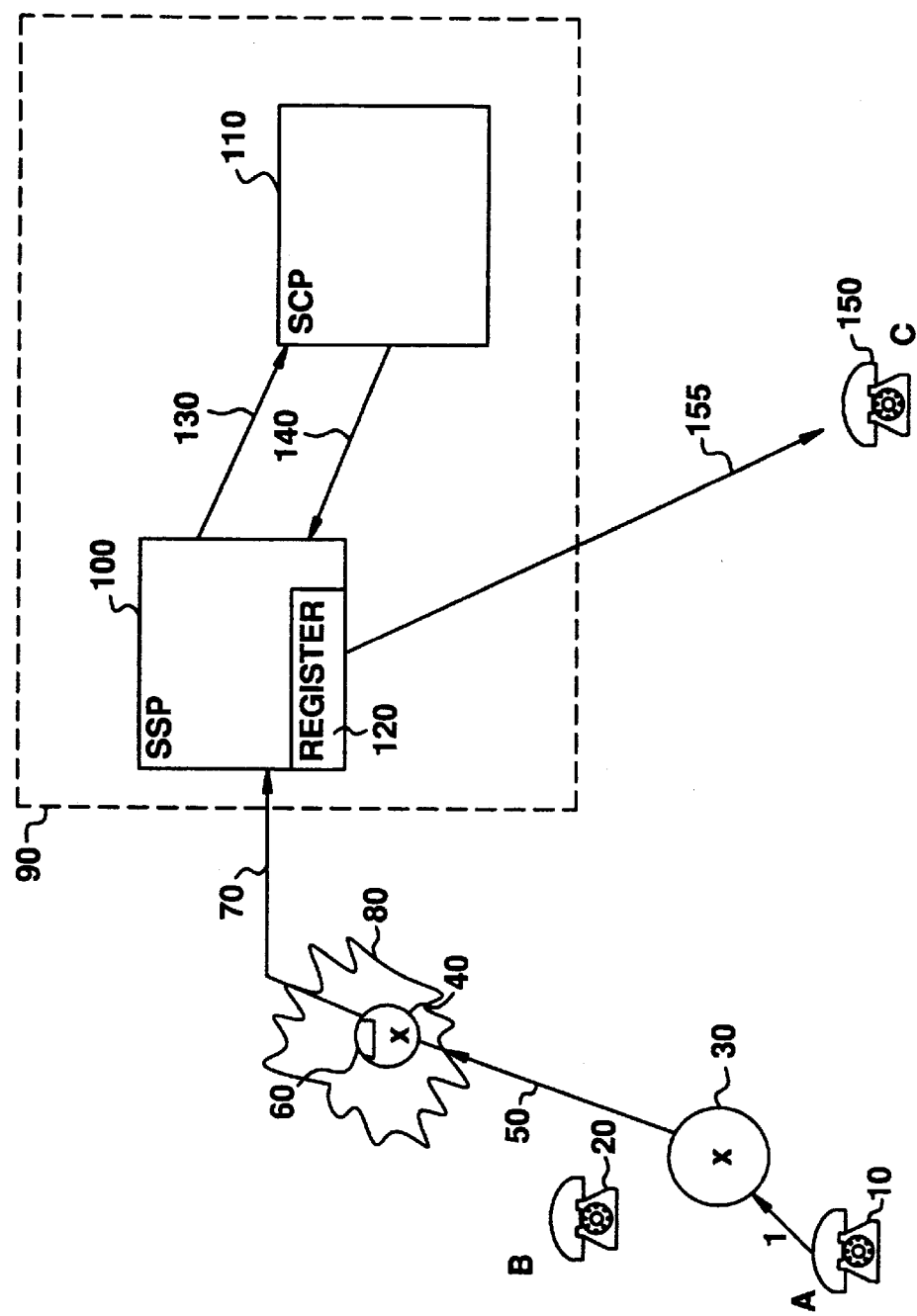
FIG. 1 is a block diagram of an Intelligent Network forwarding a call from terminal B to terminal C.

FIG. 1 is a block diagram of an Intelligent Network illustrating the routing of a call dialed to terminal B 20, but instead forwarded to terminal C 150. The call 1 is originally placed from terminal A 10 to terminal B 20. A first local exchange 30 serving terminal A 10 receives an indication from terminal A 10 to originate a call to terminal B 20. The first local exchange 30 transmits a call setup signal 50, such as an Initial Address Message (IAM), over the existing signaling system NO. 7 (SS7) telecommunications network 80 to establish a call connection between terminal A 10 and terminal B 20. The transmitted IAM is routed by the serving SS7 telecommunications network 80 by analyzing the included called-party number representing dialed terminal B 20.

A second local exchange 40 serving terminal B 20 receives the transmitted IAM signal 50. Before establishing a call connection with terminal B 20, the second local exchange 40 determines whether or not terminal B 20 has any one of the call forwarding features activated. Such features may include Call Forwarding Variable (CFV), Call Forwarding on Busy (CFB), Call Forwarding on Don't Answer (CFDA), and other similar subscriber features. In case of CFV, all incoming calls are immediately rerouted to the dedicated forward-to number by the second local exchange 40. On the other hand, in case of CFB, incoming calls are only rerouted if the called subscriber's terminal is busy. As another illustration, in case of CFDA, the forwarding will occur if the called party fails to answer the call within a predetermined period of time or number of rings.

If terminal B 20 has a call forwarding subscriber feature activated, and if all of the prerequisite forwarding conditions are met, a feature module 60 within the second local exchange 40 retrieves the previously stored forward-to number for use as the new called-party number. A new IAM signal is transmitted and comprises a redirection counter, which has been incremented by one, a calling-party directory number, a forwarded-from directory number, and the new called-party number, which is the forward-to directory number specified by the activated call forwarding feature. The serving SS7 telecommunications network 80 then routes the new IAM signal 70 to a third local exchange 90 serving terminal C 150.

The third local exchange 90 may be a conventional local exchange or an Intelligent Network (IN) comprised of an SSP 100 and an SCP 110. In the case of the third local exchange 90 being an IN, the Signal Switching Point (SSP) 100 receives the new IAM signal 70 and copies the forwarded-from directory number from that signal to a register 120. The SSP 100 then transmits a signal to the Signal Control Point (SCP) 110 requesting call treatment regarding this particular incoming call. The SCP 100 retrieves subscriber information associated with the forward-to directory number. Next, the SCP 110 transmits 140 the retrieved subscriber information to the SSP 100 which uses the information to set up a call 155 to terminal C 150.

Figure 2:
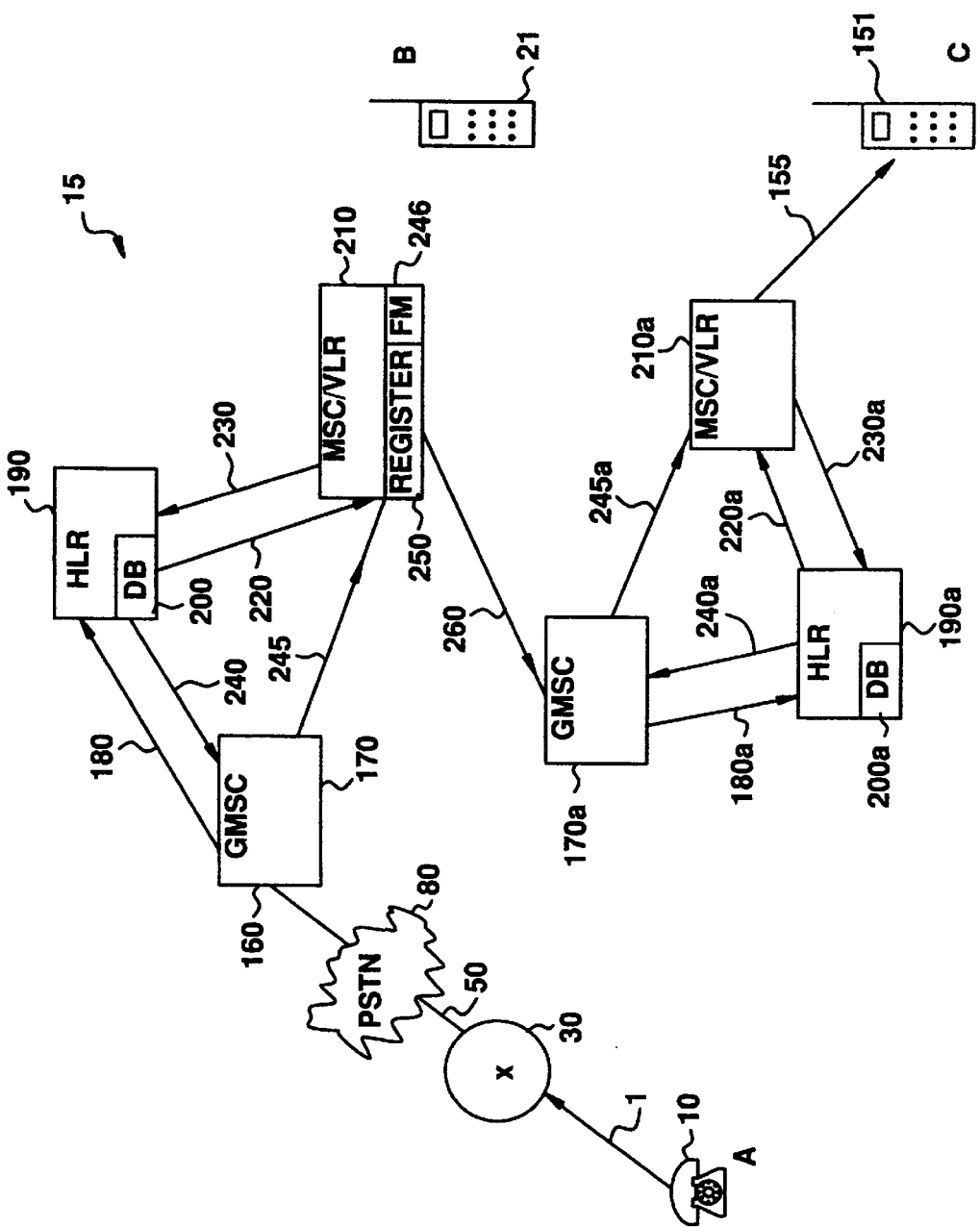
FIG. 2 is a block diagram of a Public Land Mobile Network forwarding a call from mobile subscriber B to mobile subscriber C.

FIG. 2 is a block diagram of a Public Land Mobile Network (PLMN) routing a call dialed to mobile subscriber B 21 and forwarded to mobile subscriber C 151 in accordance with Call Forwarding Busy (CFB). The original call is placed from terminal A 10 to mobile station B 21. The first local exchange 30 serving terminal A 10 receives an indication 1 from terminal A 10 to originate a call to mobile station B 21. The first local exchange 30 transmits a call setup signal 50, such as an Initial Address Message (IAM), over the existing signaling system NO. 7 (SS7) telecommunications network 80 to establish a call connection between terminal A 10 and mobile station B 21. The transmitted IAM signal 50 is routed by the serving SS7 telecommunications network 80 by analyzing the included called-party number representing mobile station B 21.

The serving SS7 80 routes 160 the call to a Gateway Mobile Switching Center (GMSC) 170 for the PLMN. The Home Location Register (HLR) comprises a centralized database storing the current location of the mobile station B 21. The GMSC 170 sends a Send Routing Information (SRI) signal 180 to the HLR 190 requesting routing instructions for the call. Using the called-party number from the received SRI signal 180, the HLR 190 indexes a database 200 and retrieves the address for the Mobile Switching Center/ Visitor Location Register(MSC/VLR) 210 currently serving mobile station B 21. The HLR 190 then sends a Provide Routing Information (PRI) 220 signal to that MSC/VLR 210. The MSC/VLR 210 provides the HLR 190 with a roaming number which will enable the serving GMSC 170 to reroute the received IAM signal to the serving MSC/VLR 210. Next, the roaming number is provided in a Provide Routing Information Acknowledgment (PRI_ACK) signal 230 that is transmitted back to the HLR 190. The HLR 190, in turn, returns to the GMSC 170 a Send Routing Information Acknowledgment (SRI_ACK) 240 containing the roaming number. The GMSC now routes the IAM signal 245 to the MSC/VLR 210 using the roaming number specified in the SRI_ACK 240. After receiving the rerouted IAM signal from the GMSC 170, the MSC/VLR 210 then determines whether or not mobile subscriber B 21 has any of the call forwarding features activated. If mobile subscriber B 21 has any of the call forwarding features activated and if all of the prerequisite forwarding conditions are met, a feature module 246 within the MSC/VLR 210 retrieves, from a register 250, the previously stored forward-to number as the new called-party number. For example, if mobile subscriber B 21 is busy and has CFB activated, the MSC/VLR attempts to forward the call to the previously stored forward-to number. The called party number within the received IAM signal is replaced with the retrieved forward-to number and the redirection counter is incremented. The MSC/VLR 210 then routes the new IAM 260 signal to GMSC 170a serving the forward-to number.

In a manner similar to that described above, the GMSC 170a acquires a roaming number for mobile subscriber C 151. The GMSC 170a then routes 245a the IAM signal to the MSC/VLR 210a serving mobile subscriber C 151. The MSC/VLR 210a then routes the call from terminal A 10 to mobile subscriber C 151.

Figure 3:
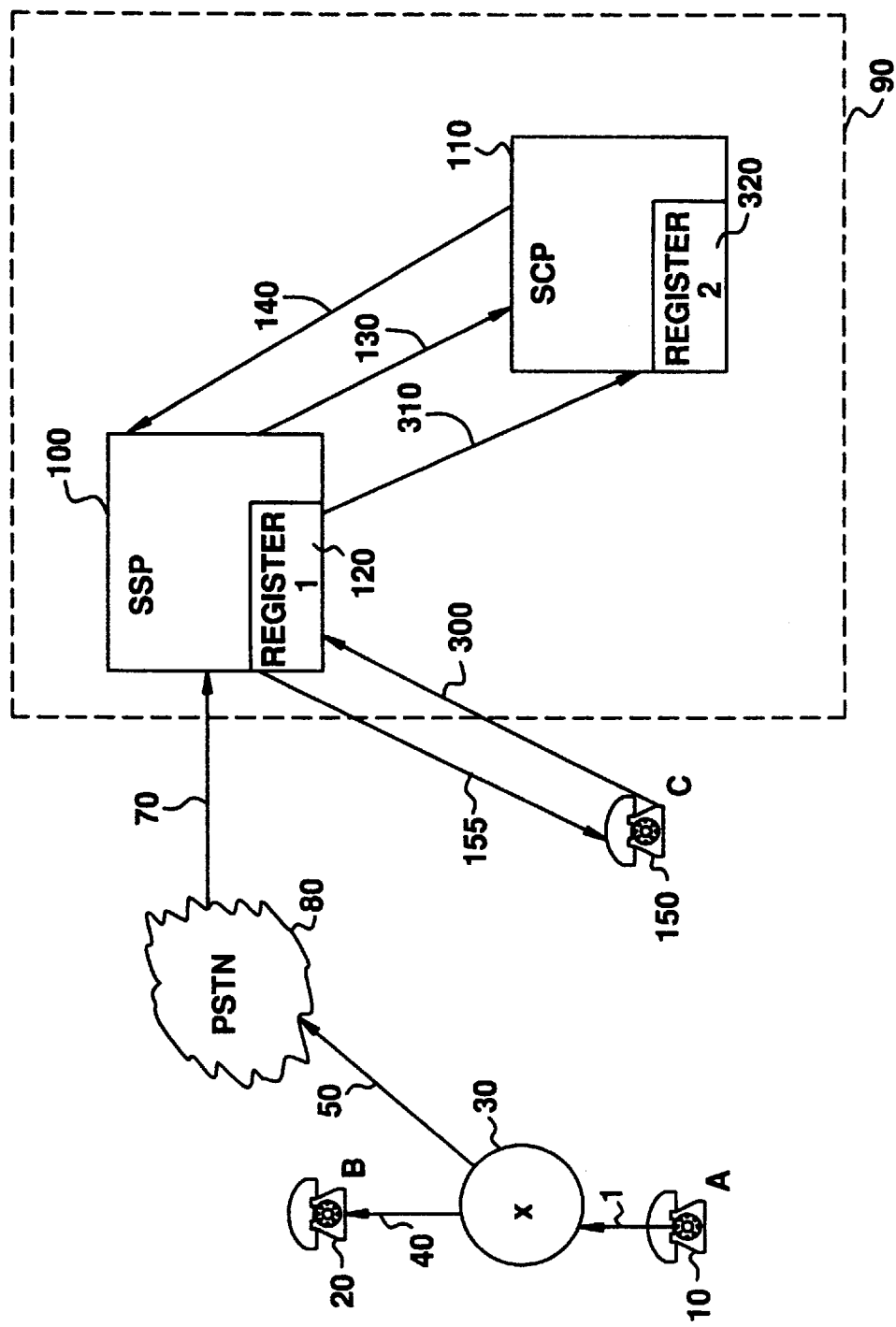

FIGS. 3 and 3a are diagrams of an Intelligent Network (IN) being instructed to restrict subsequent incoming forwarded calls in accordance with the teachings of the present invention. After the completion of the process described in FIG. 1, the SSP 100 receives an indication 300 from terminal C 150 to block all subsequent forwarded calls from the directory number associated with the last forwarded call to terminal C 150. Such an indication includes a Dual Tone Multi-Frequency (DTMF) signal, pulse digits, or voice request recognized by a voice recognition system. All of the above methods are well known within the telecommunications field and will not be described in detail herein.

The SSP 100 then retrieves, from the first register 120 the directory number associated with the last forwarded call to terminal C 150. The SSP 100 then transmits to the SCP 110 that retrieved directory number and an indication 310 to restrict all subsequent forwarded calls to terminal C 150 from the transmitted directory number. The SCP 110 stores in the second register 320 data correlating the transmitted directory number from which subsequent forwarded calls are to be blocked with the directory number representing terminal C 150.

As another embodiment of the present invention, a subscriber associated with terminal C 150 may also provide the directory number to be blocked directly to the serving SSP. The SSP 100 then transmits to the SCP 110 the subscriber specified directory number and an indication 310 to restrict all subsequent forwarded calls to terminal C 150 from the received directory number.

Moreover, within a non-IN telecommunications network, the above described SCP and SSP functionality is performed within a conventional local exchange such as a end office switch or a Private Automatic Branch exchange (PABX). However, as the system and method of the present invention are applicable to any node processing an incoming call within a telecommunications system, it will be understood that the description of the present invention in the context of IN and PLMN provided herein is by way of explanation of the present invention rather than of limitation of the scope of the invention.

Figure 4:
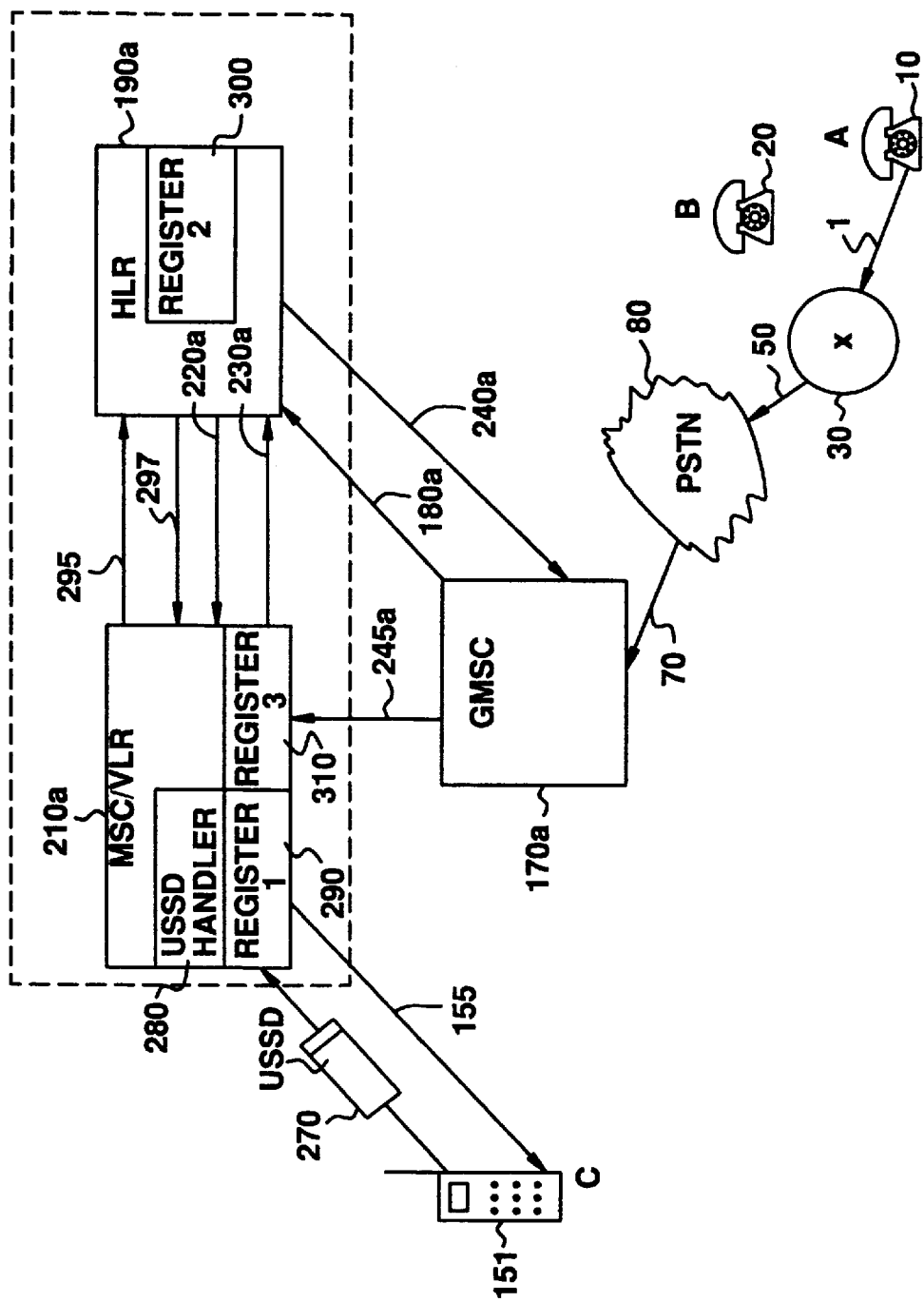

FIGS. 4 and 4*a* are diagrams of a Public Land Mobile Network being instructed to restrict subsequent incoming forwarded calls in accordance with the teachings of the present invention. After mobile subscriber C 151 answers the last incoming call, the subscriber realizes that the calls are being incorrectly forwarded by a particular forwarded-from number and wishes to activate a subscriber feature to selectively bar all future forwarded calls from that particular number. It is understood that calls dialed directly from that particular number from which forwarded calls are to be blocked remain unaffected. As a result, the MSC/VLR 210*a* receives an indication 270 from mobile station C 151 to block all subsequent forwarded calls from the directory number associated with the last forwarded call to mobile subscriber 151. The indication 270 may comprise an Unstructured Supplementary Service Data (USSD) message, processed by a USSD Handler 280, or a Short Message Service (SSS) message, communicated over a stand-alone Dedicated Control Channel (SDCCH). Furthermore, the indication 270 may include any of the methods described in FIG. 3. Thereafter, the MSC/VLR 210*a* retrieves the directory number associated with the last forwarded call to mobile subscriber C 151 from a first register 290. The MSC/VLR 210*a* then transmits 295 to the HLR 190*a* the retrieved directory number and an indication to restrict all subsequent forwarded calls to mobile subscriber C 151 from the retrieved directory number. The HLR 190*a* stores in a second register 300 data correlating the transmitted directory number from which subsequent forwarded calls are to be blocked with the directory number representing mobile subscriber C 151. Next, the MSC/VLR 210*a* receives a transmission 297, which is comprised of a copy of the data stored in the second register 300 of the HLR 190*a*. That data is then copied into a third register 310.

Figure 5A:
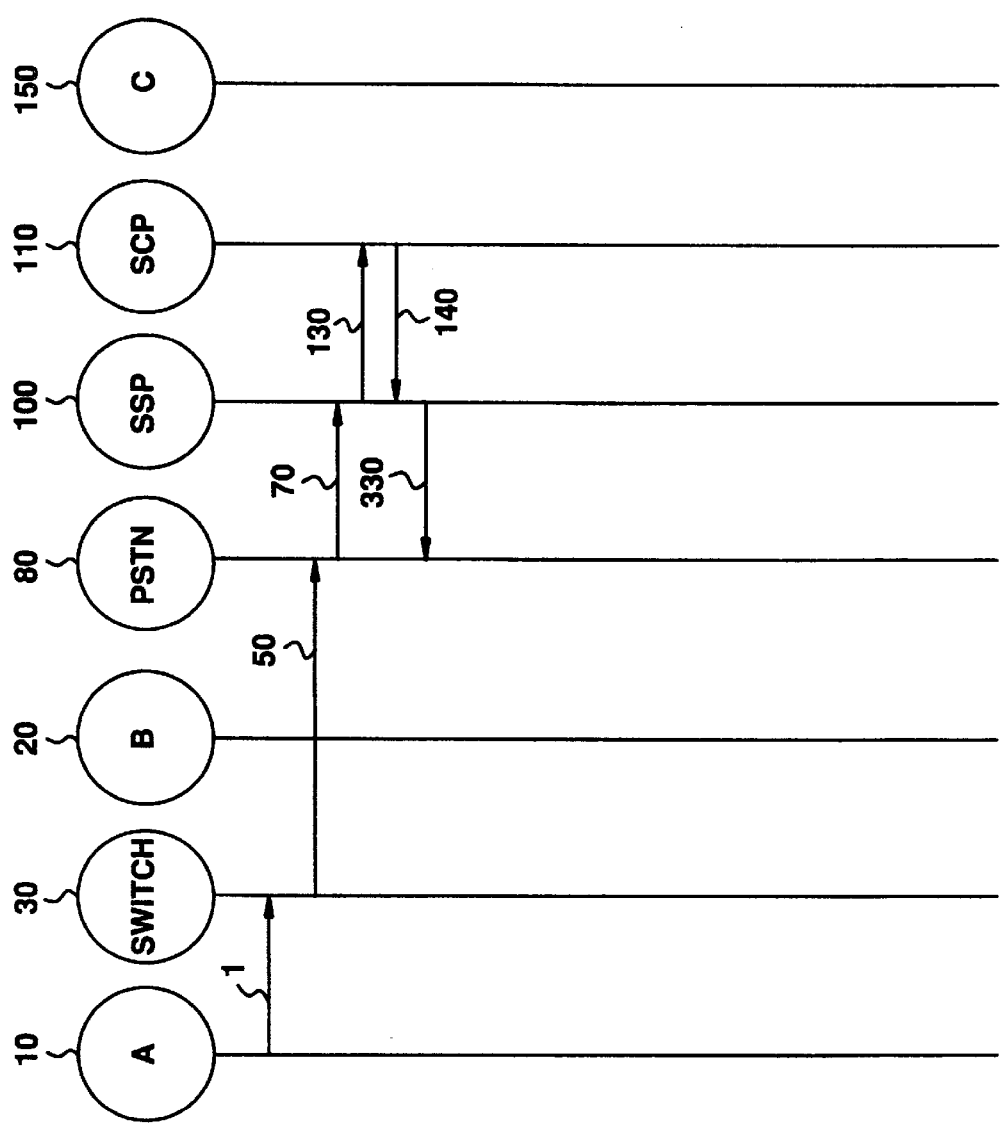

FIGS. 5 and 5*a* are diagrams of an Intelligent Network rejecting a forwarded call in accordance with the teachings of the present invention. FIG. 5 is similar to FIG. 1 except that, unlike in FIG. 1, terminal C 150 in FIG. 5, has restricted incoming calls forwarded from terminal B 20 to terminal C 150. The SSP 100, first determines if the call has been forwarded. This determination can be made, for example, by evaluating the included redirection counter. If the redirection counter is greater than zero, then the SSP 100 recognizes that the call has been forwarded. A specific variable or parameter can further be set to indicate that the call has been forwarded. Therefore, after making such a determination, the SSP 100 requests instructions from the SCP. After the SSP 100 transmits data from the IAM signal 130 to the SCP 110, the SCP 110 indexes the second register 320 by the retrieved called-party number. Correlated with the called-party number is a directory number from which all calls forward to terminal C 150 should be blocked. The forwarded-from number is compared with the number indexed with the called-party number. If the called-party number, directory number representing terminal B 20, matches the directory number indexed with terminal C 150, the SCP 110 indicates to the SSP 100 that the call will not be routed to terminal C 150. Finally, the SSP 100 transmits 330 that the call was denied.

Figure 6:
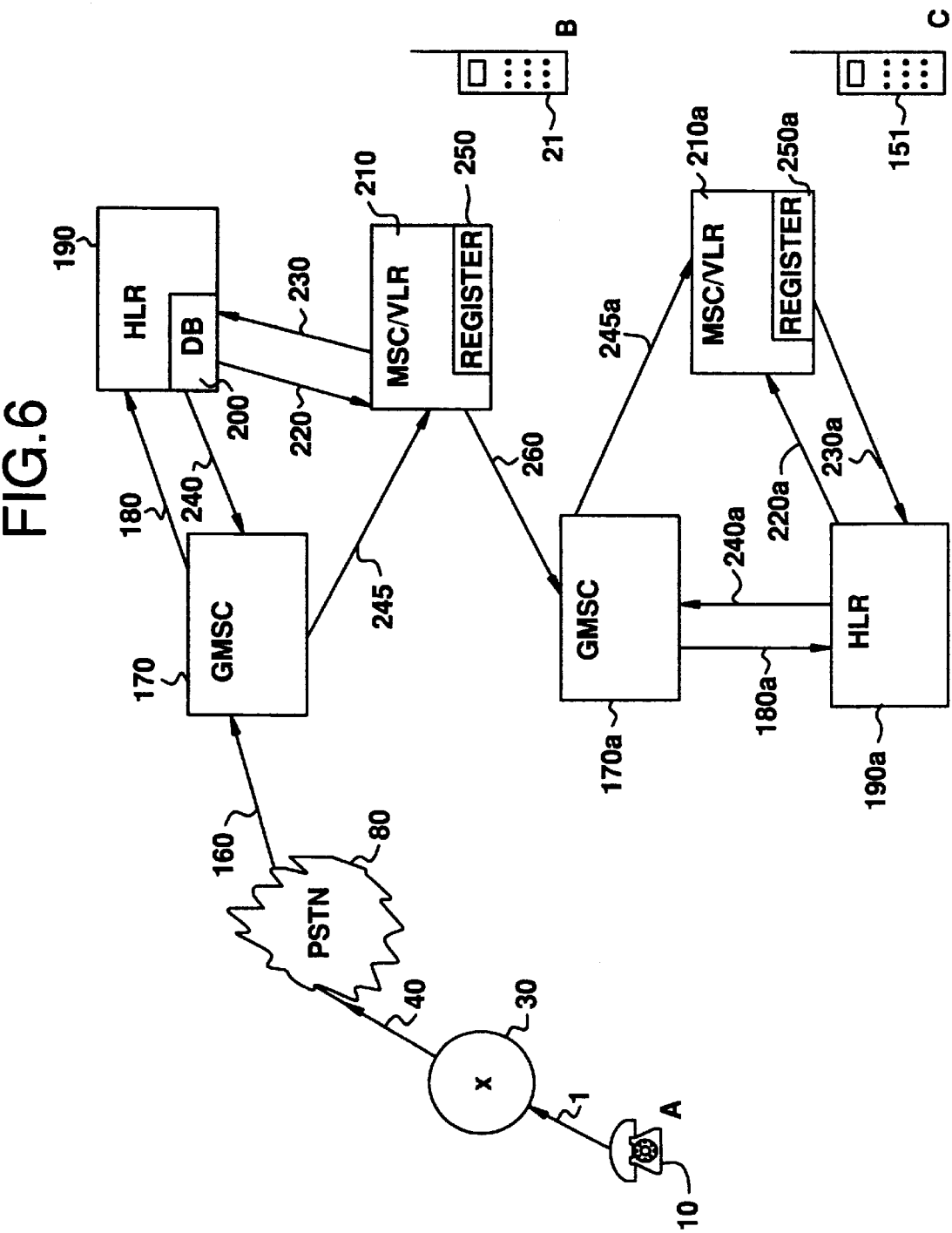

FIG. 6 and 6*a* are diagrams of a Public Land Mobile Network rejecting a forwarded call in accordance with the teachings of the present invention. FIG. 6 is similar to FIG. 2 except that, unlike in FIG. 2, mobile subscriber C 151 in FIG. 6 has restricted incoming calls forwarded from mobile subscriber B 21 to mobile subscriber C 151. After the GMSC 170*a* routes the call to the MSC/VLR 210*a*, in a manner similar to the methods described above, the MSC/VLR 210*a* determines whether the call has been forwarded or not. For example, the MSC/VLR 210*a* retrieves the redirection counter from the IAM signal 245*a*. If the redirection counter is not greater than zero then the call is routed to mobile subscriber C 151 as in FIG. 2. Otherwise, the MSC/VLR 210*a* retrieves the directory number from which forwarded calls are to be blocked by indexing the register 250*a*. The register 250*a* stores the data correlating the called-party directory number and the forwarded-from directory number from which forwarded calls are to be blocked. If the forwarded-from number contained in the IAM matches the retrieved number indexed with the called party number, then the call connection to mobile subscriber C 151 is denied.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for selectively blocking calls forwarded from a first terminal toward a second terminal, said method for blocking calls comprising the steps of:

receiving an incoming call placed to said first terminal and forwarded to said second terminal;

identifying said incoming call as a forwarded incoming call by examining a redirection counter contained in a call setup signal;

retrieving, from data previously correlated, a previously stored directory number by indexing a directory number representing said second terminal, said previously stored directory number stored in a node of a wireless telecommunications network;

comparing said previously stored directory number with a forwarded-from number associated with said forwarded incoming call; and rejecting said incoming call if said previously stored directory number matches said forwarded-from number associated with said forwarded incoming call.

2. The method of claim 1, wherein the step of identifying said incoming call as a forwarded incoming call further comprises the steps of:

extracting said redirection counter from said call setup signal;

comparing said redirection counter to zero; and signaling that the call was forwarded if said redirection counter is greater than zero.

3. The method of claim 1, wherein said step of comparing said previously stored directory number with said forwarded-from number further comprises the steps of:

extracting said forwarded-from number representing said first terminal from a call setup signal.

4. The method of claim 1, wherein said node of a wireless telecommunications network comprises a Signal Control Point within an Intelligent Network.

5. The method of claim 1, wherein said node of a wireless telecommunications network comprises a Home Location Register.

6. The method of claim 1, wherein said forwarded-from number is contained in a calling party number parameter of a call setup signal.

7. A telecommunications system comprising:

a telecommunications exchange for routing calls, forwarding calls, and selectively blocking forwarded calls;

a first terminal, connected to said telecommunications exchange, for initiating a call;

a second terminal, having a first directory number, said second terminal connected to said telecommunications exchange, said second terminal comprising the destination of said call initiated by said first terminal;

a third terminal, having a second directory number, said third terminal connected to said telecommunications exchange, said third terminal comprising the destination of calls forwarded by said telecommunications exchange destined for said second terminal; and wherein said telecommunications exchange operates to:

determine that the call initiated by said first terminal to said second terminal should be forwarded to said third terminal;

examine a redirection counter contained in a call setup signal to determine whether the call was forwarded;

compare said first directory number with a previously stored third directory number correlated to said second directory number in response to a determination that the call was forwarded, said third directory number identifying a terminal from which forwarded calls should be blocked; and reject forwarding of said call if said first directory number associated with said second terminal matches said previously stored third directory number.

8. The telecommunications system of claim 7, wherein said telecommunications exchange comprises:

an Intelligent Network, wherein said Intelligent Network comprises:

a Signal Switching Point; and a Signal Control Point.

9. The telecommunications system of claim 7, wherein said telecommunications exchange comprises:

a Gateway Mobile Switching Center;

a Home Location Register; and a Mobile Switching Center/Visitor Location Register.

10. The telecommunications system of claim 7, wherein said third terminal comprises a wireless station.

11. The telecommunications system of claim 7 further comprising:

a database for storing data correlating said second directory number with the directory number from which forwarded calls were requested to be blocked.

12. The telecommunications system of claim 11, wherein said database is contained within a Home Location Register.

13. The telecommunications system of claim 11, wherein said database is contained within a Mobile Switching Center/Visitor Location Register.

14. The telecommunications system of claim 11, wherein said database is contained within a Signal Control Point.

15. A method of activating a subscriber feature to restrict forwarded calls, said method comprising the steps of:

storing a first directory number representing a first terminal in a first register associated with a Signal Switching Point contained within an Intelligent Network wireline telecommunications system;

receiving an indication from a second terminal for activating said subscriber feature;

retrieving said stored first directory number from said first register in response to receiving said indication;

storing, at a second register associated with a Signal Control Point contained within said Intelligent Network, said retrieved first directory correlated number with a second directory number representing said second terminal in response to receiving said indication; and rejecting an incoming call that is forwarded from a terminal having a directory number stored in said second register.

16. The method of claim 15, wherein said step of storing said first directory number representing said first terminal further comprises the steps of:

receiving a first call originated by a third terminal and forwarded from said first terminal to said second terminal; and extracting said first directory number from a call setup signal associated with said first call.

17. The method of claim 15 further comprising the steps of:

receiving an incoming call towards said second terminal;

retrieving said first directory number from said second register;

determining that said incoming call has been forwarded from said first directory number; and rejecting said incoming call in response to said determination.

18. A method of activating a subscriber feature to restrict forwarded calls, said method comprising the steps of:

storing a first directory number representing a first terminal in a first register associated with an Mobile Switching Center/Visitor Location Register;

receiving an indication from a second terminal for activating said subscriber feature;

retrieving said stored first directory number from said first register in response to receiving said indication;

storing, at a second register associated with a Home Location Register connected to said Mobile Switching Center/Visitor Location Register, said retrieved first directory number correlated with a second directory number representing said second terminal in response to receiving said indication; and rejecting an incoming call that is forwarded from a terminal having a directory number stored in said second register.

19. The method of claim 18, wherein said step of storing said first directory number representing said first terminal further comprises the steps of:

receiving a first call originated by a third terminal and forwarded from said first terminal to said second terminal; and extracting said first directory number from a call setup signal associated with said first call.

20. The method of claim 18, wherein said step of storing said retrieved first directory number further comprises the steps of:

storing said first directory number correlated with said second directory number at said second register;

transferring said first directory number from said second register to a third register associated with said Mobile Switching Center/Visitor Location Register.

21. The method of claim 18 wherein said indication comprises an Unstructured Supplementary Service Data packet.

22. The method of claim 18 further comprising the steps of:

receiving an incoming call towards said second terminal;

retrieving said first directory number from said second register;

determining that said incoming call has been forwarded from said first directory number; and rejecting said incoming call in response to said determination.

* * * * *